United States Patent
Canfield et al.

(10) Patent No.: US 9,061,729 B2
(45) Date of Patent: Jun. 23, 2015

(54) SUSPENSION SYSTEM FOR WHEELED VEHICLES

(71) Applicants: Christopher Canfield, Layton, UT (US); Lance Canfield, Layton, UT (US)

(72) Inventors: Christopher Canfield, Layton, UT (US); Lance Canfield, Layton, UT (US)

(*) Notice: Subject to any disclaimer, the term of this patent is extended or adjusted under 35 U.S.C. 154(b) by 0 days.

(21) Appl. No.: 13/896,281

(22) Filed: May 16, 2013

(65) Prior Publication Data

US 2014/0042726 A1    Feb. 13, 2014

Related U.S. Application Data

(60) Provisional application No. 61/681,503, filed on Aug. 9, 2012.

(51) Int. Cl.
| | |
|---|---|
| *B62K 25/00* | (2006.01) |
| *B62K 25/26* | (2006.01) |
| *B62K 25/30* | (2006.01) |

(52) U.S. Cl.
CPC ............. *B62K 25/26* (2013.01); *B62K 25/30* (2013.01)

(58) Field of Classification Search
CPC ........ B62K 25/286; B62K 25/28; B62K 25/04
USPC ........................................................ 280/284
See application file for complete search history.

(56) References Cited

U.S. PATENT DOCUMENTS

| | | |
|---|---|---|
| 3,657,945 A | 4/1972 | Golden et al. |
| D236,708 S | 9/1975 | Konzorr |
| 4,039,200 A | 8/1977 | McGonegle |
| D284,459 S | 7/1986 | Shimizu |
| D286,996 S | 12/1986 | Hartmann et al. |
| D320,369 S | 10/1991 | Feamster, III et al. |
| 5,121,937 A | 6/1992 | Lawwill |
| 5,217,241 A | 6/1993 | Girvin |
| D341,108 S | 11/1993 | Chen |
| 5,306,036 A | 4/1994 | Busby |
| 5,441,292 A | 8/1995 | Busby |
| 5,452,910 A | 9/1995 | Harris |
| 5,474,318 A | 12/1995 | Castellano |
| 5,509,679 A | 4/1996 | Leitner |
| 5,553,881 A | 9/1996 | Klassen et al. |
| 5,628,524 A | 5/1997 | Klassen et al. |
| 5,662,405 A | 9/1997 | Kuo |
| 5,678,837 A | 10/1997 | Leitner |

(Continued)

OTHER PUBLICATIONS

Mark Jordan "The Most Significant Patents in Mountain Bike History", Decline magazine, Aug. 2009.

(Continued)

*Primary Examiner* — Kevin Hurley
*Assistant Examiner* — Michael Stabley
(74) *Attorney, Agent, or Firm* — Kunzler Law Group

(57) ABSTRACT

A suspension system for supporting a frame of a vehicle on at least one wheel that is coupled via a chain to a chain ring on the frame. The suspension system includes a structural member supporting an axle of the wheel, a first linkage arm connecting the structural member to the frame, a second linkage arm connecting the structural member to the frame, and a shock absorber coupled between the frame and one of the structural member, the first linkage arm and the second linkage arm. Additionally, the center of curvature (CC) of the axle of the wheel is located within a predetermined radius of a tangent contact point between a tension segment of the chain and the chain ring throughout a range motion of the suspension system.

16 Claims, 10 Drawing Sheets

(56) References Cited

U.S. PATENT DOCUMENTS

| | | | |
|---|---|---|---|
| 5,791,674 | A | 8/1998 | D'Aluisio et al. |
| 5,899,480 | A | 5/1999 | Leitner |
| 6,161,858 | A | 12/2000 | Tseng |
| 6,203,042 | B1 | 3/2001 | Wilcox |
| 6,244,610 | B1 | 6/2001 | Kramer-Massow |
| 6,378,885 | B1 | 4/2002 | Ellsworth et al. |
| 6,386,568 | B1 | 5/2002 | Tribotte |
| 6,471,230 | B2 | 10/2002 | Ellsworth et al. |
| 6,488,301 | B2 | 12/2002 | Klassen et al. |
| 6,595,538 | B2 | 7/2003 | Ellsworth et al. |
| 6,647,826 | B2 | 11/2003 | Okajima et al. |
| 6,793,230 | B1 | 9/2004 | Cheng |
| 6,843,494 | B2 | 1/2005 | Lam |
| 6,880,847 | B2 | 4/2005 | Chamberlain et al. |
| 6,969,081 | B2 | 11/2005 | Whyte |
| 7,059,620 | B2 | 6/2006 | Chamberlain et al. |
| RE39,159 | E | 7/2006 | Klassen et al. |
| D524,195 | S | 7/2006 | Neal |
| 7,100,930 | B2 | 9/2006 | Saiki |
| 7,128,329 | B2 | 10/2006 | Weagle |
| 7,216,883 | B2 * | 5/2007 | O'Connor ............... 280/284 |
| 7,427,077 | B2 | 9/2008 | Lesage et al. |
| 7,506,528 | B2 | 3/2009 | Chamberlain |
| 7,566,066 | B2 | 7/2009 | Chang et al. |
| 7,581,743 | B2 | 9/2009 | Graney |
| 7,658,394 | B1 | 2/2010 | Huang |
| D615,003 | S | 5/2010 | Canfield et al. |
| 7,717,212 | B2 | 5/2010 | Weagle |
| 7,784,810 | B2 | 8/2010 | Graney |
| 7,806,422 | B2 | 10/2010 | I |
| 7,815,207 | B2 | 10/2010 | Currie |
| 7,918,472 | B2 | 4/2011 | Peterson |
| 7,934,739 | B2 | 5/2011 | Domahidy |
| 7,938,424 | B2 | 5/2011 | Arraiz |
| 8,002,301 | B2 | 8/2011 | Weagle |
| 2006/0181053 | A1 | 8/2006 | Huang et al. |
| 2010/0102531 | A1 | 4/2010 | Graney et al. |
| 2010/0109282 | A1 | 5/2010 | Weagle |
| 2011/0115181 | A1 | 5/2011 | Weagle |
| 2011/0247450 | A1 | 10/2011 | Lai |
| 2012/0061933 | A1 | 3/2012 | Weagle |
| 2012/0126506 | A1 * | 5/2012 | Zawistowski ............... 280/275 |
| 2013/0249188 | A1 * | 9/2013 | Beale ............... 280/284 |

OTHER PUBLICATIONS

Kenny Rakestraw, "Specialized v. Scott USA", UC Berkeley Patent Engineering Presentation, know about as early as Mar. 16, 2012.
AMP B3 bicycle, know about as early as 1997.
AMP B4 bicycle, know about as early as 1998.

* cited by examiner

SUSPENSION SYSTEM FOR WHEELED VEHICLES

FIELD

This disclosure is in the field of suspension systems, and more specifically, relates to rear suspension systems for wheeled vehicles such mountain bikes and motorcycles.

BACKGROUND

Due to the increase in consumer interest and demand and the advent of extreme sports competitions, the technology for recreational vehicles such as mountain bikes and motorcycles has advanced considerably in recent decades. One area of ongoing interest and development is the suspension systems of such vehicles, especially as relating to their performance, handling and safety. As known to one of skill in the art, for example, when there is an increase in power to the driving wheel or wheels of a bicycle, a motorcycle and other wheeled vehicle (e.g. normally the rear wheel in a bicycle or motorcycle), so as to accelerate the vehicle, some of the force being transmitted to the driving wheel can be cross-coupled into the suspension system. This cross-coupled force often appears as an applied torque or rotational moment on the suspension system which causes the powered end of the vehicle to either pull down (e.g. squat) or push up (e.g. kick). This can be problematic for several reasons.

For instance, any portion of the driving force or power which is cross-coupled into the suspension system reduces the amount of power that is transmitted to the driving wheel, with a corresponding reduction in the overall efficiency of the driving mechanism. For a human being providing the power to the rear wheel through foot pedals and a chain drive, this inefficiency can result in reduced performance and the unnecessarily-early onset of fatigue. In the case of a bicycle, moreover, moving the rear of the bicycle up or down can alter the position and orientation of the rider relative to the frame of bicycle, which in turn can affect the vehicle dynamics and the rider's control of the bike. Finally, causing the vehicle to squat or kick moves the suspension system out of its optimal neutral response position and thereby limits the available range of travel and shock absorbing capabilities of the suspension system for the duration of the powered state.

SUMMARY

The subject matter of the present application has been developed in response to the present state of the art, and in particular, in response to the problems and needs in the art that have not yet been fully solved by currently available wheeled vehicle suspension systems. Accordingly, the subject matter of the present application has been developed to provide a suspension system for wheeled vehicles, as well as methods of making a suspension system for wheeled vehicles, that overcome at least some shortcomings of the currently-available suspension systems found in the prior art.

For example, according to one representative embodiment, a suspension system for supporting a frame of a vehicle on at least one wheel that is coupled via a chain to a chain ring on the frame includes a structural member supporting an axle of the wheel, a first linkage arm connecting the structural member to the frame, a second linkage arm connecting the structural member to the frame, and a shock absorber coupled between the frame and one of the structural member, the first linkage arm and the second linkage arm. Additionally, the center of curvature (CC) of the axle of the wheel is located within a predetermined radius of a tangent contact point between the tension segment of the chain and the chain ring throughout a range motion of the suspension system, with the predetermined radius being less than or about one half of the radius of the chain ring.

According to another representative embodiment, a suspension system for supporting a frame of a bicycle on a rear wheel of the bicycle that is coupled via a chain to a chain ring on the frame. The suspension system includes a structural member supporting an axle of the wheel, an upper linkage arm connecting the structural member to the frame, a lower linkage arm connecting the structural member to the frame, and a shock absorber coupled between the frame and one of the structural member, the first linkage arm and the second linkage arm. Additionally, the center of curvature (CC) of the axle of the wheel is located within a predetermined radius of a tangent contact point between a tension segment of the chain and the chain ring throughout a range motion of the suspension system, with the predetermined radius being less than or about one half of the radius of the chain ring.

According to another representative embodiment, a method of making a suspension system for supporting a frame of a vehicle on at least one wheel of the vehicle includes obtaining both the vehicle frame having a chain ring rotatably mounted thereto and a structural member configured to support an axle of the wheel of the vehicle. The method also includes obtaining a first linkage arm having a first anchor pivot joint and a first floating pivot joint spaced from the first anchor pivot, a second linkage arm having a second anchor pivot joint and a second floating pivot joint spaced from the second anchor pivot, and a shock absorber which is configured to flexibly maintain a separation between the frame and the structural member.

The method further includes coupling the first anchor pivot joint to the frame and the first floating pivot joint to the structural member, coupling the second anchor pivot joint to the frame and the second floating pivot joint to the structural member, and coupling the shock absorber between the frame and one of the structural member, the first linkage arm and the second linkage arm. In addition, the center of curvature (CC) of the axle is located within a predetermined radius of an intended tangent contact point between the chain ring and the tension segment of the chain which applies a driving force to the wheel, and throughout a range motion of the suspension system. In the representative embodiment, the predetermined radius is less than or about one half of a radius of the chain ring.

BRIEF DESCRIPTION OF THE DRAWINGS

In order that the advantages of the subject matter of the present disclosure will be readily understood, a more particular description of the subject matter will be rendered by reference to specific embodiments that are illustrated in the appended drawings. Understanding that these drawings depict only typical embodiments of the subject matter of the present disclosure and are not therefore to be considered to be limiting of its scope, the subject matter will be described and explained with additional specificity and detail through the use of the accompanying drawings, in which.

Figure 1:
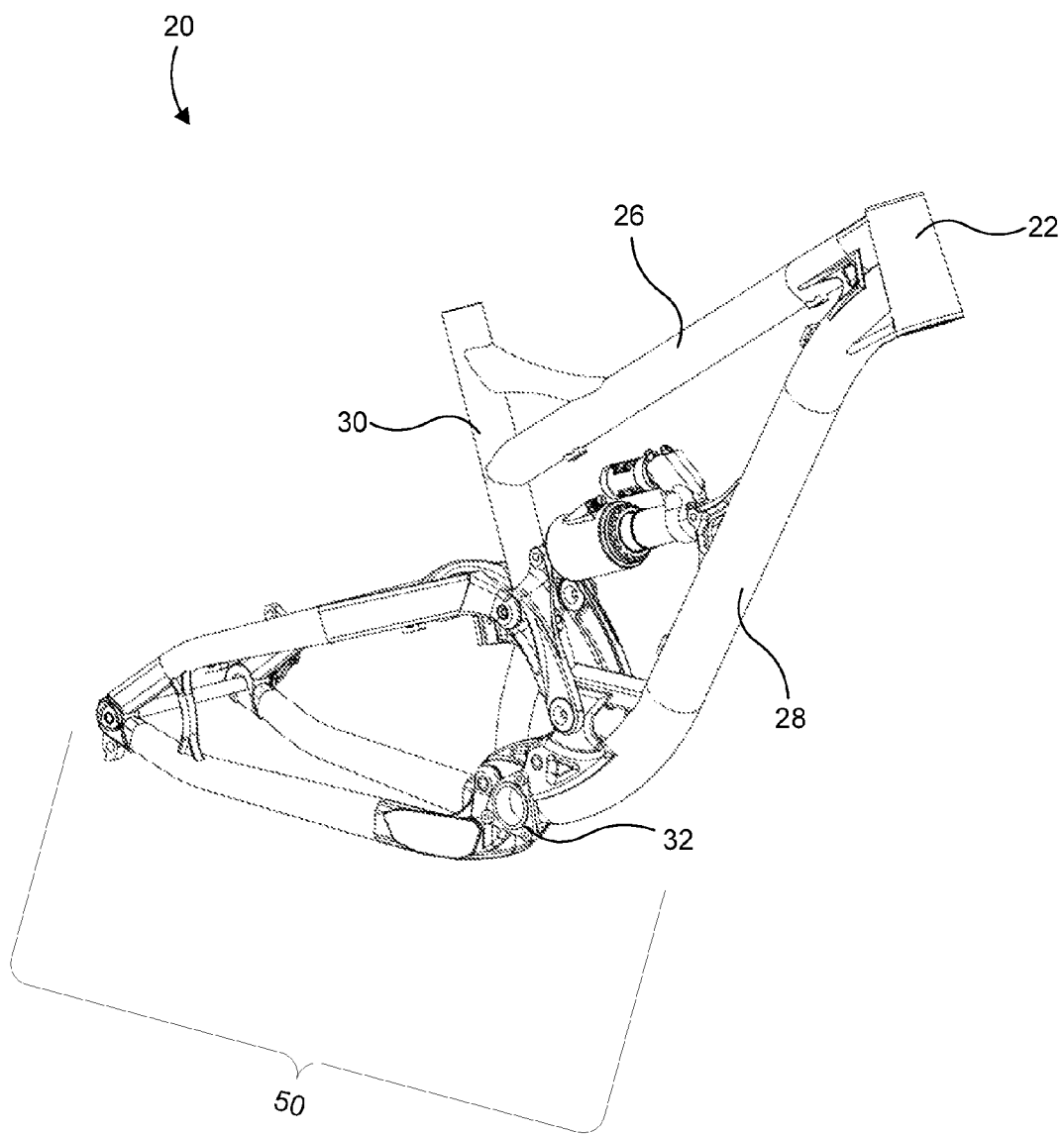
FIG. 1 is a perspective view diagram illustrating one embodiment of a frame of a mountain bike-type bicycle having a suspension system.

The drawings are not necessarily drawn to scale.

Detailed Description

The subject matter of the present disclosure has been developed in response to the present state of the art in wheeled vehicle suspension systems. In particular, the subject matter of the present disclosure addresses the lack of a rear suspension system for mountain bike-type bicycles that are configured to effectively de-couple the suspension system from the driving forces transmitted along a tension segment of a drive chain throughout the range of motion of the suspension system. However, it is contemplated that the present disclosure is not limited to mountain bike-type bicycles, and also has application with upright and recumbent road bicycles and other chain-driven vehicles such as motorcycles, three- and four-wheeled recreational vehicles, etc., which suffer from the same shortcomings. Accordingly, the subject matter of the present disclosure has been developed to provide a suspension system for wheeled vehicles and a method of making a suspension system for wheeled vehicles that may overcome many or all of the above-discussed or other shortcomings in the art.

Reference throughout this specification to features, advantages, or similar language does not imply that all of the features and advantages that may be realized with the subject matter of the present disclosure should be or are in any single embodiment of the subject matter. Rather, language referring to the features and advantages is understood to mean that a specific feature, advantage, or characteristic described in connection with an embodiment is included in at least one embodiment of the subject matter of the present disclosure. Thus, discussion of the features and advantages, and similar language, throughout this specification may, but do not necessarily, refer to the same embodiment.

Furthermore, the described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

Similarly, reference throughout this specification to "one embodiment", "an embodiment", "a representative embodiment", or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Illustrated in FIGS. 1-16 are several representative embodiments of a suspension system for wheeled vehicles, which embodiments also include one or more methods of making the suspension system. As described herein, the suspension system provides several significant advantages and benefits over other suspension systems and methods of making the suspension systems. However, the recited advantages are not meant to be limiting in any way, as one skilled in the art will appreciate that other advantages may also be realized upon practicing the present disclosure FIG. 1 is a perspective view diagram illustrating one embodiment of a frame 20 of a mountain bike-type bicycle having a suspension system 50. The frame 20 includes a head tube 22 which supports a front fork and a front suspension system which provides the connection between a front wheel and the frame 20. In addition to the head tube 22, the basic components of the frame 20 may include the top tube 26, the down tube 28, the seat tube 30, and the bottom bracket. 32.

The rear suspension system 50, as will be recognized by one of skill in the art, may be configured in many different configurations, including but not limited to, single pivot, split pivot, four-bar, etc. One example of a rear suspension 50 suitable for use with embodiments of the present disclosure will be described below in greater detail with reference to FIGS. 2-3.

Figure 2:
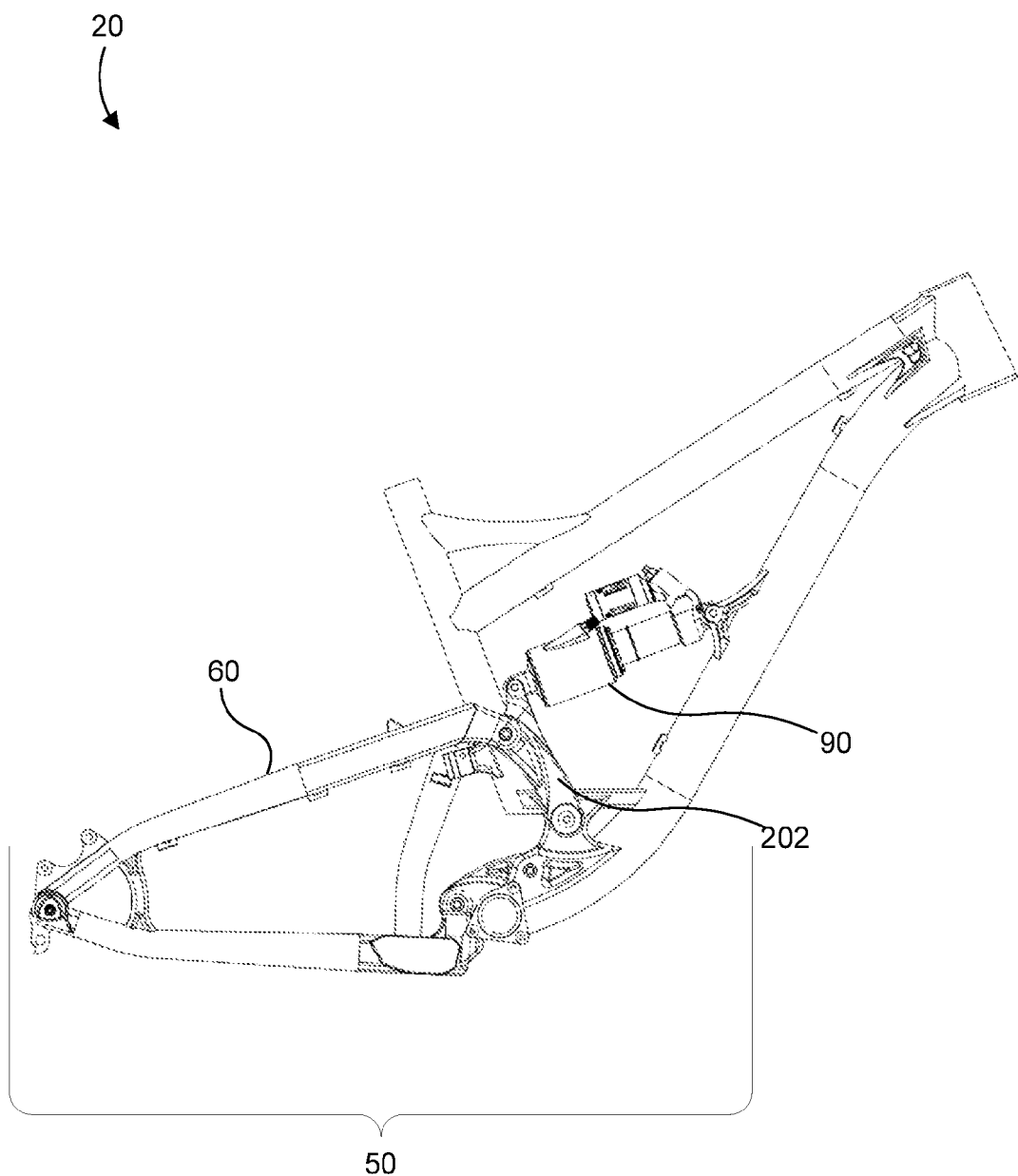
FIG. 2 is a side view diagram illustrating another embodiment of the frame.

FIG. 2 is a side view diagram illustrating another embodiment of the frame 20. The frame 20, in the depicted embodiment, includes the rear suspension system 50 which is pivotally coupled to the frame 20. The depicted rear suspension system 50 is an example of a four-bar system which is dampened with a shock absorber 90. The shock absorber 90 may be pivotally connected to the frame 20 and a structural member 60 of the rear suspension system 50. The shock absorber 90 may couple the frame 20 to the rear suspension system 50 via linkage members 202. The shock absorber 90 automatically compresses when a force is applied to the end of the shock absorber 90. The forces include, but are not limited to, weight loading (e.g., weight of bike and/or weight of rider), dynamic loading due to irregularities in the terrain, and driving forces applied to pedals of the bike (described in greater detail below with reference to FIGS. 4-5).

Figure 3:
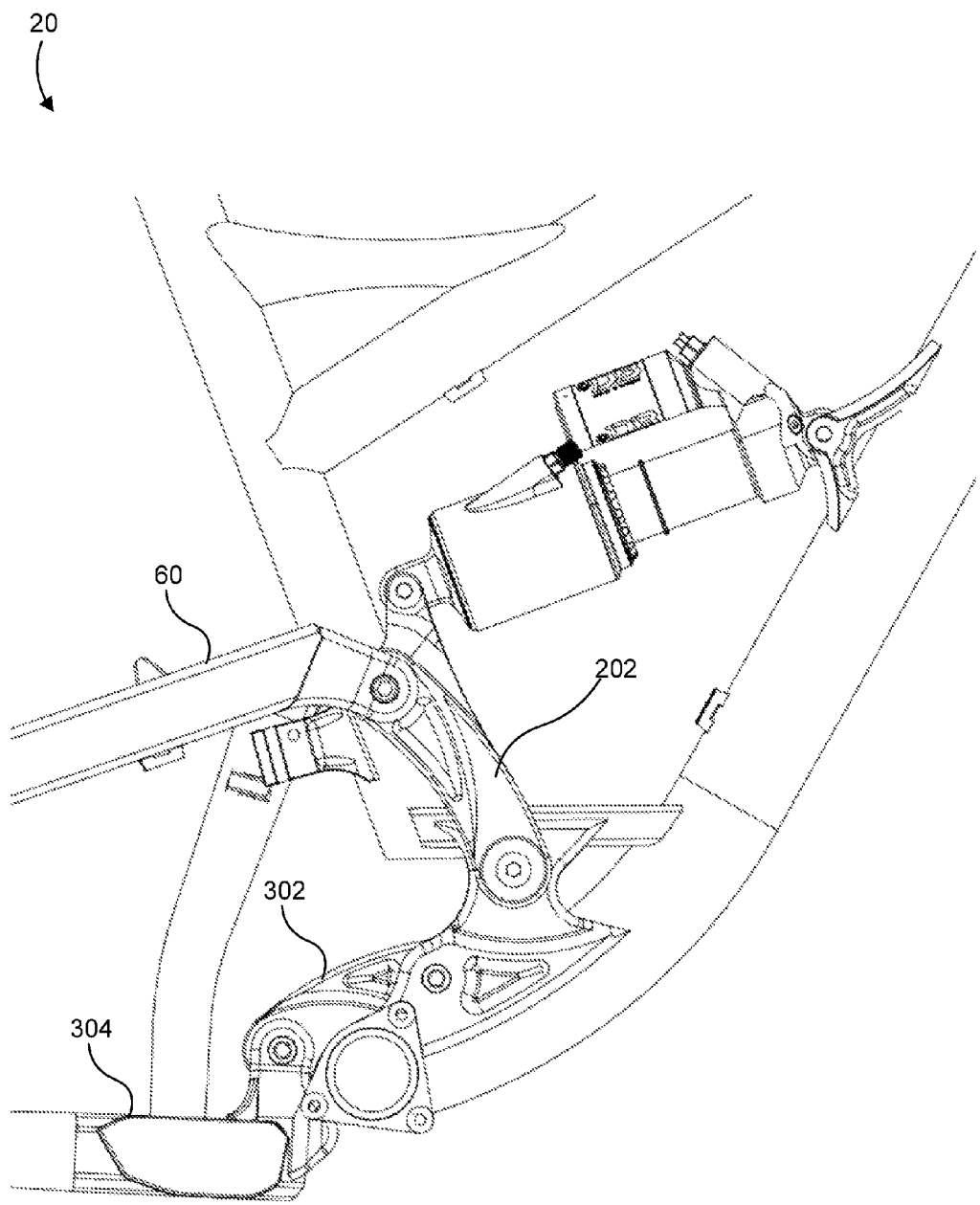
FIG. 3 is a side view diagram illustrating a partial view of the frame.

FIG. 3 is a side view diagram illustrating a partial view of the frame 20. As depicted, the frame 20 couples to the rear suspension system 50 via linkage members 202 to the upper support member 60, and via a lower linkage member 302 to the lower support member 304. The linkage members 202, 302 allow the structural members 60, 304 to move up and down in relation to the frame 20. The path of a tire coupled to the support members 60, 304 may not follow a simple arc because of the two linkage members 202, 302. As will be discussed in greater detail below, the length, orientation, and pivot placement of the linkage members 202, 302 (or linkage arms) may be adjusted to cause the rear axle to move forward during a portion of the upward rotation of the rear suspension system so that a center of curvature of the rear suspension system aligns with a contact point of a drive chain and a drive sprocket or chain ring.

Figure 4:
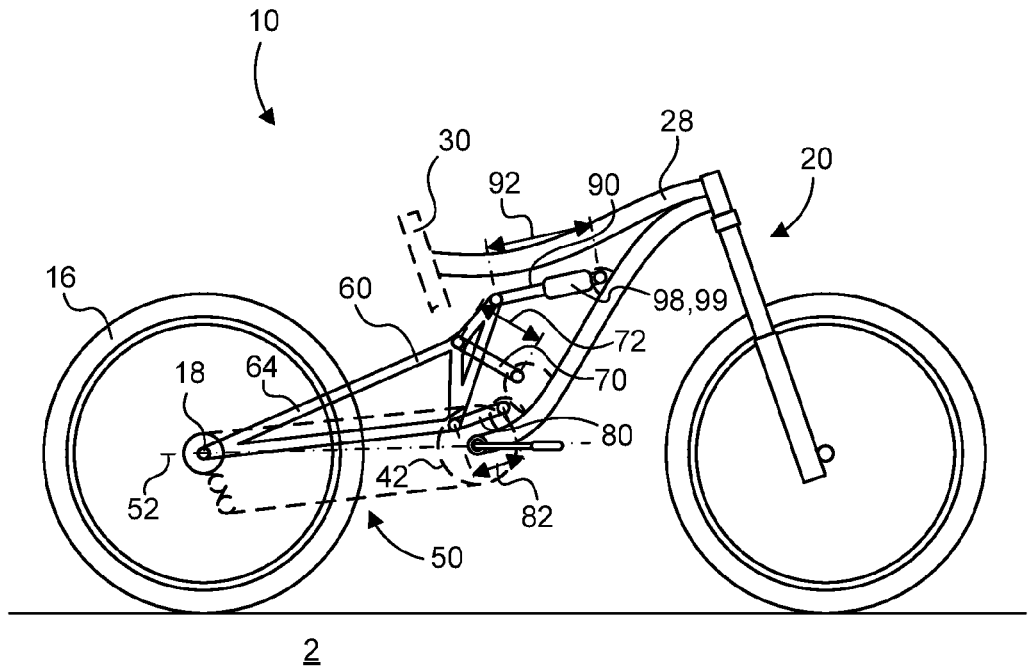
FIG. 4 is a schematic side view of the bicycle and suspension system of FIG. 1, with the suspension system in an extended position.
Figure 5:
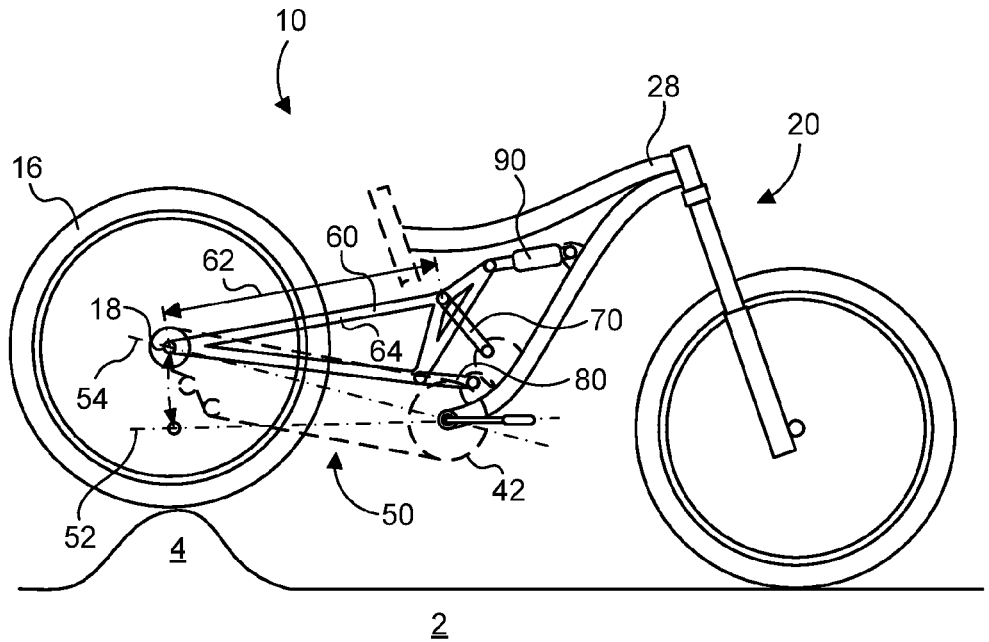
FIG. 5 is another schematic side view of the bicycle and suspension system of FIG. 1, with the suspension system in a compressed position.

A schematic side view of the bicycle 10 and its suspension system 50 are illustrated in FIGS. 4 and 5. As can be seen, the suspension system 50 of the present disclosure comprises a four-bar linkage configuration that includes the structural member 60 that is movable relative to the frame 20 of the bicycle. The structural member 60 is movably connected to the frame 20 with a rotatable upper linkage arm 70 having a fixed length 72 and a rotatable lower linkage arm 80 having a fixed length 82. In the embodiment shown, the structural member 60 is also directly connected to the frame 20 with a shock absorber 90 having an adjustable length 92. As described in more detail below, however, the shock absorber 90 is not limited to being directly coupled between the frame 20 and the structural member 60, but may be coupled between the frame 20 and any one of the structural member 60, the upper linkage arm 70 and the lower linkage arm 80.

The adjustable length 92 of the shock absorber 90 is controlled by a spring element 98 which automatically compresses in response to forces applied between the two ends of the shock absorber 90. These forces include the weight loading provided by the weight of the frame 20 of the bicycle 10 as well as weight of the rider (not shown). These forces also include the dynamic loading caused by bumps and irregularities in the ground surface 2 being transmitted upwards from the rear wheel towards the frame 20 as the bike travels over the ground surface 2. The dynamic loading can be reduced or eliminated through the use of a damper element 99 which can be integrated with the spring element 98 in the shock absorber 90.

The structural member 60 is configured to receive and rotatably support the axle 18 of the rear wheel or tire 16. Additionally, the four-bar linkage configuration of the suspension system 50 allows the structural member 60 to move up and down relative to the frame 20 of the bicycle. This movement allows the rear tire 16 to rotate upwards from the normally extended position 52 (FIG. 4) to the compressed position 54 (FIG. 5) in order to accommodate an obstacle or bump 4 on the ground surface 2 over which the bicycle 10 is traveling. However, because the structural member 60 is connected to the frame 20 with the two rotatable linkage arms 70, 80, rather than being pinned at just one location, the path of the rear axle 18 of the tire 16 may not follow a simple arc as it rotates upward between the extended position 52 and the compressed position 54. Instead, the two rotatable linkage arms 70, 80 may be configured to direct the structural member 60, and hence the rear tire 16, along a path having multiple curves and/or substantially straight sections as it moves between the two positions 52, 54.

For example, the length, orientation, and pivot placement of the two rotatable, fixed-length linkage arms 70, 80 relative to both the frame 20 and the structural member 60 can be adjusted to cause the rear axle to move forward (e.g. towards the frame 20 of the bicycle 10) during a portion of its upward rotation, and to then move rearward (e.g. away from the frame 20 of the bicycle 10) during another portion of its upward rotation. Furthermore, in some implementations the two rotatable linkage arms 70, 80 can be configured to direct the rear axle 18 to move in a line that is substantially perpendicular to the ground surface 2 during a portion of its upward rotation.

In the embodiment of the suspension system 50 shown in FIGS. 4 and 5, the structural member 60 that supports the axle 18 of the rear wheel 16 is a triangular truss 64, which can also be referred to as the rear triangle or the floating triangle. The triangular truss 64 can extend forwardly from the rear axle 18 so that its forward end is located proximate the seat tube 30 or even under the top tube 26. As shown in the illustrated embodiment, the lengths 72, 82 of the linkage arms 70, 80, respectively, which couple the structural member 60 to the frame 20 can be relatively short compared to the length 62 of the triangular truss 64. For the purposes of this disclosure, the length 62 of the triangular truss 64 can be defined as the distance between the rear axle 18 and the most-forward linkage arm pivot joint, which in suspension system 50 is the pivot joint coupling the triangular truss 64 to the upper linkage arm 70.

As disclosed in more detail below, in other embodiments the lengths 72, 82 of the connecting linkage arms 70, 80 can be increased while the length 62 of the structural member 60 supporting the rear tire 16 is reduced to approximately that of the connecting linkage arms, or even less. The structural member can also be single bar-type member when viewed from the side, such as a seat stay assembly.

Figure 6:
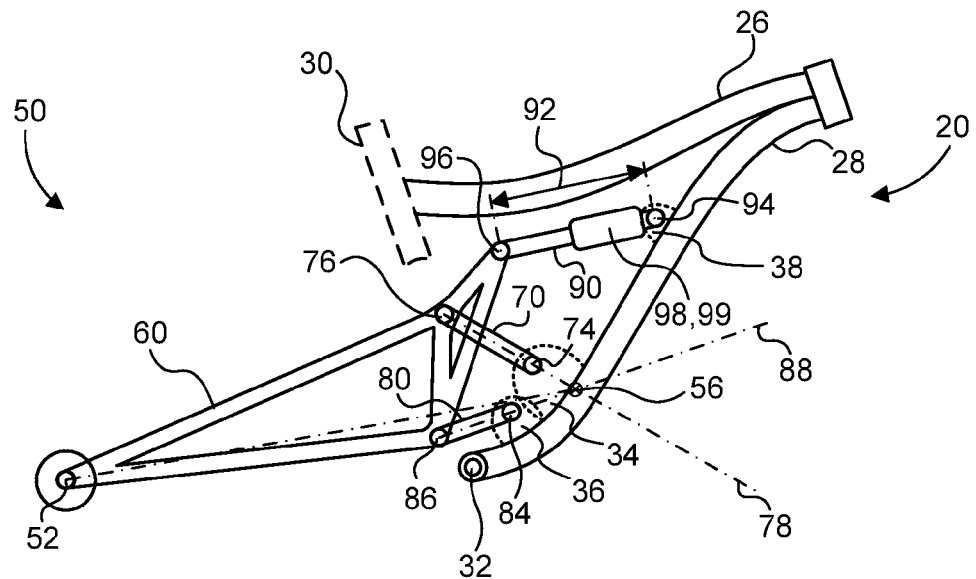
FIG. 6 is a close-up schematic view of the suspension system of FIG. 1, with the suspension system in an extended position.

Referring now to FIG. 6, both of the upper linkage arm 70 and the lower linkage arm 80 have at least two pivot joints each, including forward anchor pivot joints 74, 84 that couple the linkage arms 70, 80, respectfully, to anchor locations on the frame 20, and rear floating pivot joints 76, 86 that couple the linkage arms 70, 80, respectively, to the floating structural member 60. In addition, the shock absorber 90 includes a shock anchor pivot joint 94 that couples the shock absorber 90 to the frame 20, and a shock floating pivot joint 96 the couples the shock absorber to the floating structural member 60. The pivot joints can be selected from a variety of types of pivoting joints, including but not limited to pins, journal bearings, ball bearings, roller bearings, needle bearings and the like.

Each of the pivot joints 74, 76, 84, 86, 94, 96 can be configured to provide substantially friction-free rotation of the upper linkage arm 70, the lower linkage arm 80, and the shock absorber 90 relative to both the frame 20 of the bicycle and the structural member 60. The fixed length upper linkage arm 70 and lower linkage arm 80 can thus define the path of movement of the structural member 60 relative to the frame 20. As a result, the portion of the weight of the frame 20 and the rider (not shown) which is borne by the rear tire of the bicycle is substantially controlled by the spring element 98 included within the shock absorber 90. The spring constant of the spring element 98 operates to control the overall length 92 of the shock absorber 90, thereby defining the angular position of the structural member 60 along the path of movement defined by the upper and lower linkage arms 70, 80. The damper element 99 of the shock absorber 90 operations to absorb and dampen the shock loads applied to the rear tire during operation of the bicycle. Once the suspension system 50 is controlled into any particular position relative to the frame 20 by the shock absorber 90, the portion of the weight of the frame 20 and the rider which is borne by the rear tire of the bicycle is directed through the combination of the upper linkage arm 70, the lower linkage arm 80, and the shock absorber 90.

The upper anchor pivot joint 74 is rotatably coupled to the frame 20 at the upper anchor bracket 34, the lower anchor pivot joint 84 is rotatably coupled to the frame 20 at the lower anchor bracket 36, and the shock absorber anchor pivot joint 94 is rotatably coupled to the frame 20 at the shock anchor bracket 38. For illustration purposes, in the schematic drawings of FIGS. 4-6 the upper anchor bracket 34, lower anchor bracket 36 and shock anchor bracket 38 are shown as extending rearwardly from the down tube 28. It is to be appreciated, however, that the anchor brackets can be moved to different positions across the frame 20 of the bicycle, and can vary especially within the area defined by the top tube 26, the down tube 28, the seat tube 30 and the bottom bracket 32. Accordingly, the illustrated size, shape and locations of the anchor brackets for supporting the anchor pivot joints are not to be construed as limiting in any way. This is because additional brackets or cross-beam supports can be added as needed to locate the anchor pivot joints at the desired locations relative to the frame 20 in general, and relative specifically to the bottom bracket 32 and the chain ring 42 (see FIG. 4).

For instance, as previously shown in FIGS. 1-3, the upper anchor pivot joint 74 can be coupled to a cross tube 31 which extends between the seat tube 30 and the down tube 28 above the bottom bracket 32, and which, for clarity purposes, is not included in the schematic diagrams of FIGS. 4-6.

The schematic view of FIG. 6 is a close-up of the suspension system 50 and the frame 20 of the bicycle, with the suspension system 50 being positioned in the extended position 52. In the figure, an upper linkage line 78 is drawn as extending through both the upper anchor pivot joint 74 and upper floating pivot joint 76. A lower linkage line 88 is also drawn which extends through the both lower anchor pivot joint 84 and the lower floating pivot joint 86. The intersection of the upper linkage line 78 and the lower linkage line 88 at an imaginary point in space proximate the lower portion of the down tube 28 defines the instantaneous center of rotation (IC) 56 of the structural member 60.

Figure 7:
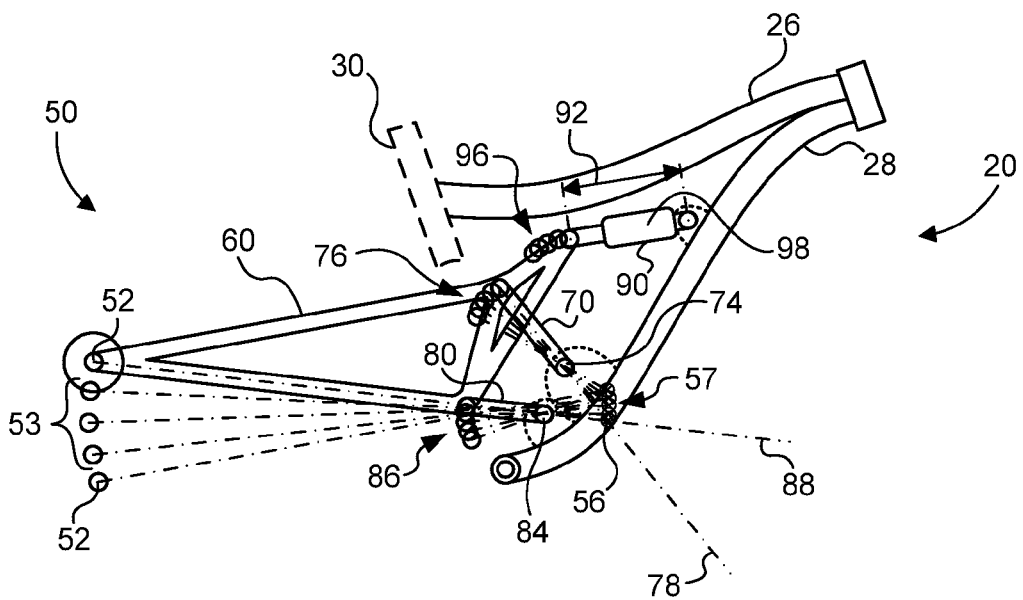
FIG. 7 is another close-up schematic view of the suspension system of FIG. 1, with the suspension system in a compressed position.

FIG. 7 is another close-up schematic view of the suspension system 50 and the frame 20 of the bicycle which illustrates the movement of the instantaneous center of rotation (IC) 56 as the structural member 60 rotates upwards from the extended position 52 towards the compressed position 54. Also shown are a number of intermediate positions 53 between the extended position 52 and the compressed position 54. The terms "extended position" and "compressed position" can refer to the state of the spring element 98 of the shock absorber 90, as well as to the overall length 92 of the shock absorber 90, which length 92 is much shorter when the spring element 98 of the shock absorber 90 is compressed (FIG. 7) than when the spring element 98 is more relaxed and extended (FIG. 6). It is to be understood, nevertheless, that even with the suspension system 50 in the extended position 52 that the spring element 98 will normally be slightly compressed during operation of the bicycle, due to the weight of the rider (not shown). This partially-compressed yet extended position is commonly referred to as "sag", and can often be varied or customized by adjusting the spring constant of the spring element 98 to take into consideration the weight of the rider.

As can be seen in FIG. 7, the upward rotation of the structural member 60 of the suspension system 50 from the extended position 52, through the intermediate positions 53 towards the compressed position 54 also results in movement of the instantaneous center of rotation IC 56. This is because the upward movement of the structural member 60 causes a simultaneous rotation of both the upper linkage arm 70 and the lower linkage arm 80, which moves the intersection of the upper linkage line 78 and the lower linkage line 88 along an IC path 57. In the embodiment of the suspension system 50 illustrated in FIG. 7, the IC path 57 is shown to be short forward and downward arc. However, depending on the lengths and orientations of the structural member 60 and the linkage arms 70, 80, and locations of the pivot joints 74, 76, 84, 86, the shape and location of the IC path of other embodiments of the suspension system may be substantially different.

Figure 8:
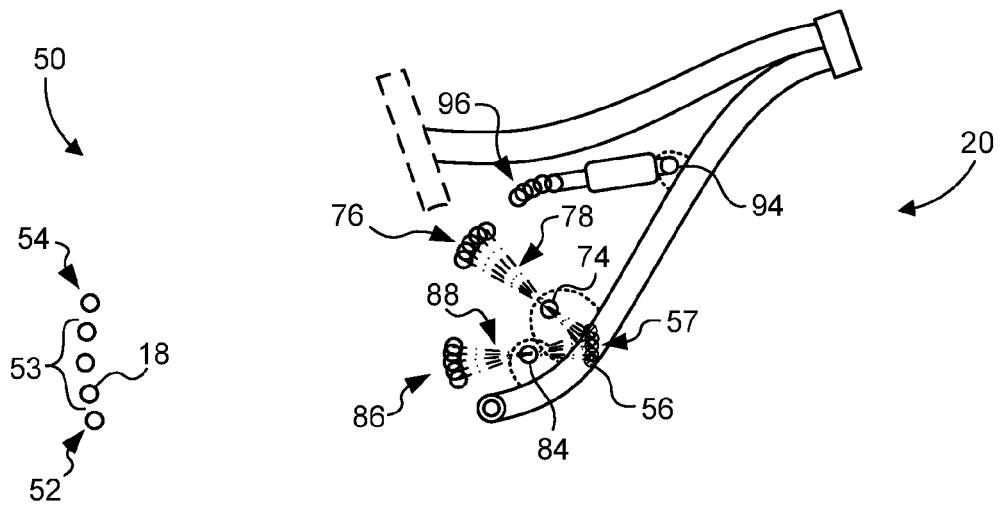
FIG. 8 is a schematic view depicting the location of the instantaneous center of rotation (IC) through a full range of motion of the suspension system of FIG. 1.

The drawing of FIG. 8 is similar to that of FIG. 7, except that the structural member and linkage arms have been removed for clarity while the locations of the linkage arm pivot joints 74, 76, 84, 86 remain as the suspension system 50 rotates upwards from the extended position 52 towards the compressed position 54. The different orientations of the upper linkage line 78 and the lower linkage line 88 are also plotted to more clearly show the location and movement of the instantaneous center of rotation (IC) 56 along the IC path 57.

Figure 9:
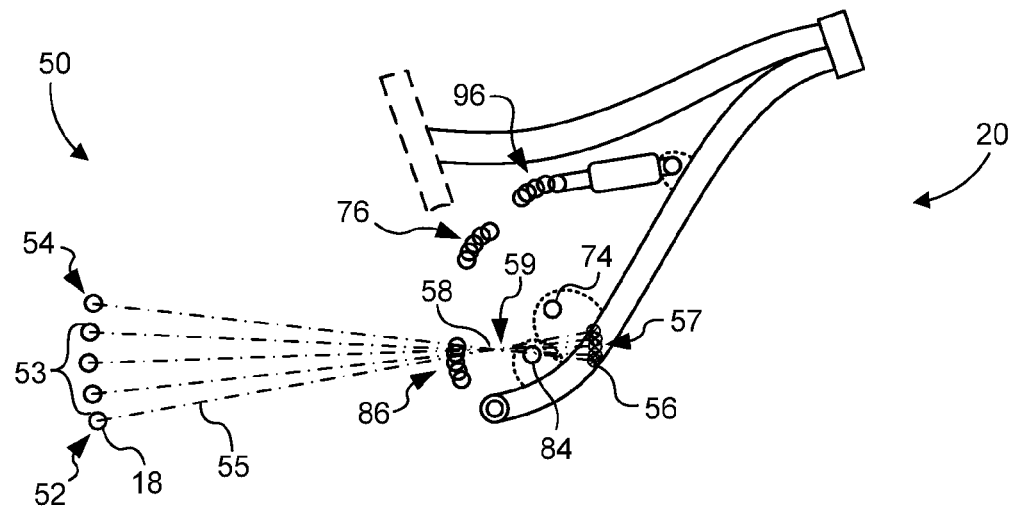
FIG. 9 is a schematic view depicting the location of the instantaneous center of curvature (CC) of the rear axle through a full range of motion of the suspension system of FIG. 1.

Referring now to the schematic view of FIG. 9, an axle line 55 can be drawn between the instantaneous center of rotation IC 56 and the axle 18 of the rear wheel for each position of the suspension system 50 between the extended position 52 and the compressed position 54. The axle line 55 is another graphical tool which illustrates the motion of a particular point on the structural member (e.g. the rear axle 18), relative to the IC 56 of the structural member. As can be seen, the length and orientation of the axle line 55 changes as the IC 56 moves along the IC path 57 during rotation of the suspension system 50 between the extended position 52 and the compressed position 54. Accordingly, the axle lines 55 will also intersect with each other along a locus of intersection points to define another imaginary point in space, namely the center of curvature (CC) 58 of the rear axle or of the rear axle's intended location if the wheel has yet not been mounted onto the bicycle. Similar to the IC 56, the CC 58 will move along the locus of axle line 55 intersection points between the extended position 52 and the compressed position 54 to define a CC path 59.

Figure 12:
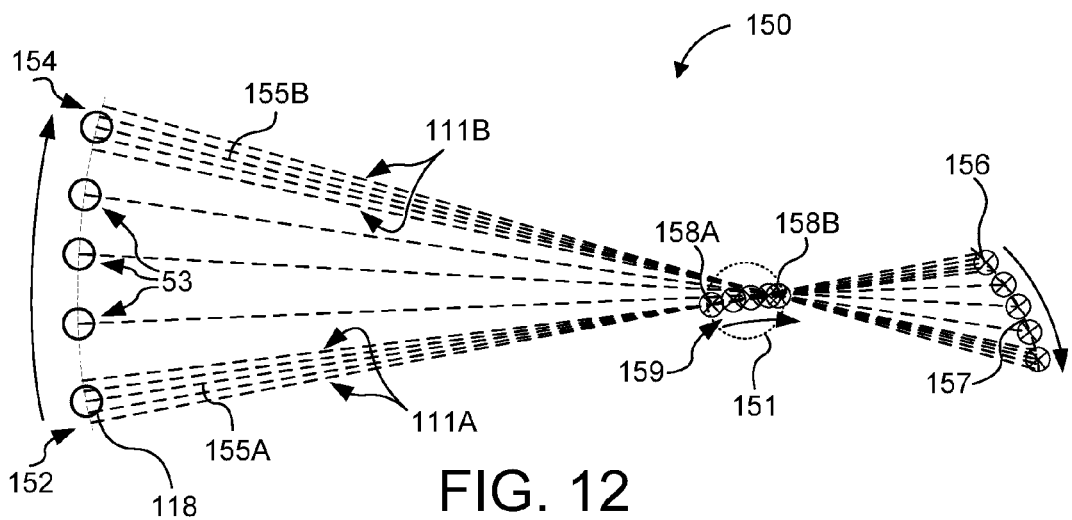
FIG. 12 is a schematic view of a plurality of intersecting axle lines showing the instantaneous center of curvature (CC) of a rear axle through a full range of motion of a suspension system, in accordance with another representative embodiment.

One method of determining the location of the center of curvature (CC) 158 of the axle of the wheel (or the intended axle location) and the shape of the CC path 159, is further illustrated in FIG. 12, which is a schematic diagram of another representative embodiment of the suspension system 150. In this drawing, the locations of the rear axle 118 and the instantaneous center of rotation (IC) 156 of the structural member (not shown) are different from those disclosed above, reflecting possible differences in the lengths and orientations of the structural member and the linkage arms, and the locations of the pivot joints. However, the method of determining the instantaneous location of the center of curvature (CC) of the rear axle 118 is equally applicable. In addition, other mathematical methods for determining the location of the center of curvature (CC) 158 of the axle or the intended axle location, as well as the shape of the CC path 159, are known to those of skill in the art.

With the suspension system 150 in the extended position 152, for instance, small perturbations 111A of the suspension system will cause the axle line 155A to rotate slightly about itself to a define a locus of axle line intersection points, thereby locating the instantaneous CC 158A of the rear axle 118 with the suspension system 150 in the extended position 152. Likewise, with the suspension system 150 in the compressed position 154, small perturbations 111B of the suspension system will cause the axle line 55B to rotate slightly about itself to a define another locus of intersection points, thereby locating the instantaneous CC 158B of the rear axle 118 with the suspension system 150 in the extended position 154. In a similar fashion, small perturbations of the suspension system 150 about each of the intermediate positions 153 will serve to define locations of the instantaneous CC for each of those positions, with the plurality of CC's serving to define the CC path 159.

With the embodiment of the suspension system 150 shown in FIG. 12, the CC path 159 appears to be a short, continuously forward and upward arc. As will be appreciated by one of skill in the art, however, the CC path can have a variety of lengths and shapes, depending on the lengths and orientations of the structural member and the linkage arms and the locations of the pivot joints. This includes CC paths wherein the CC momentarily become substantially stationary during movement of the suspension system as well as CC paths wherein the CC reverse direction. Nevertheless, in each embodiment of the present disclosure the CC path 159 is configured to be contained within a region fixed relative to the frame of the bicycle and having predetermined radius 151, as discussed below.

Figure 10:
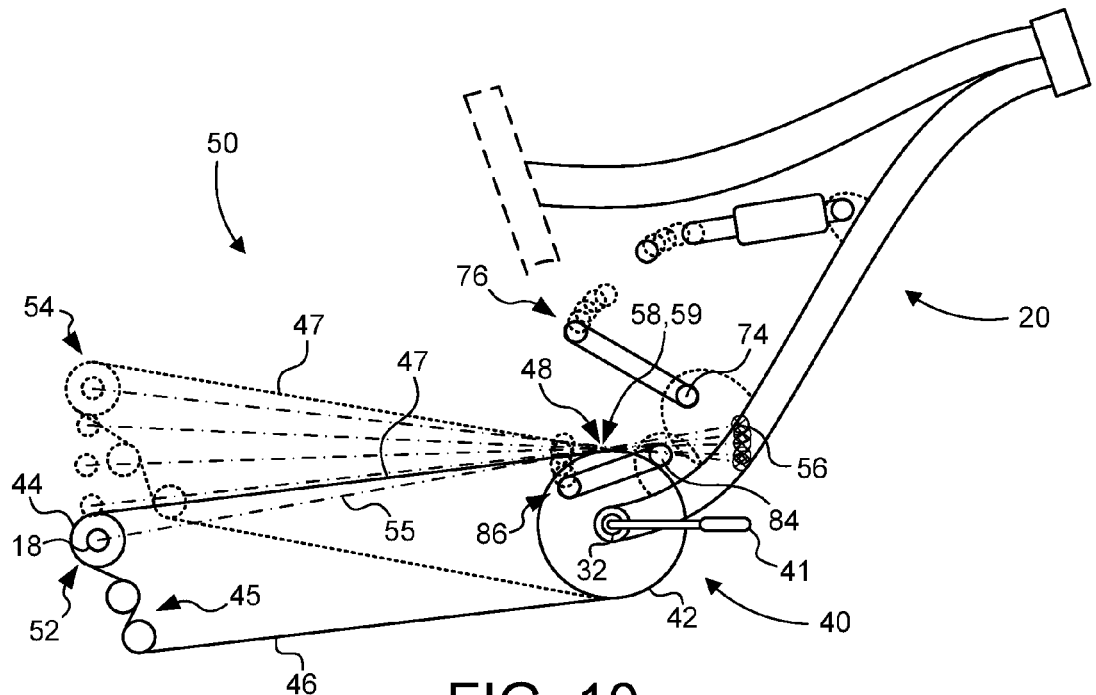
FIG. 10 is a schematic view depicting the alignment of the instantaneous center of curvature (CC) with the chain ring through a full range of motion of the suspension system of FIG. 1.
Figure 11:
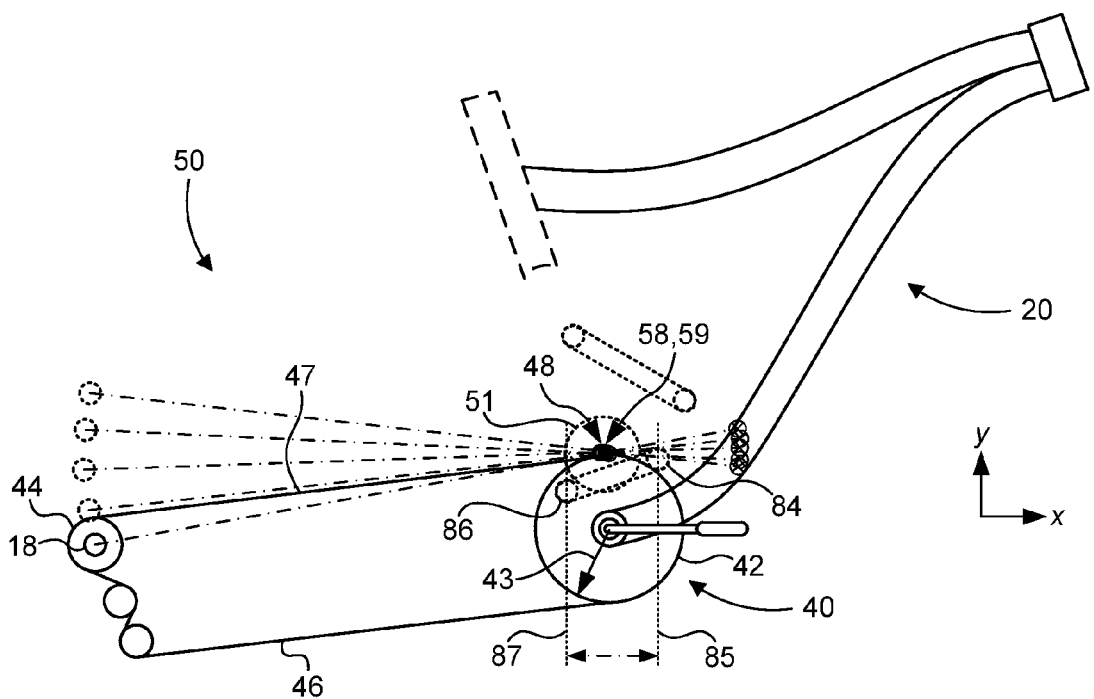
FIG. 11 is another schematic view depicting the alignment of the instantaneous center of curvature (CC) with the chain ring through a full range of motion of the suspension system of FIG. 1.

FIGS. 10 and 11 are additional schematic views of the bicycle frame 20 and suspension system 50 illustrated in FIGS. 1-9. In the drawings the structural member supporting the rear wheel is omitted for clarity, but the chain drive 40 is now included. From the bike rider's perspective, the chain drive 40 is typically attached to the right hand side of the bottom bracket 32 and rear axle 18, but other configurations are also possible. The chain drive 40 includes pedals 41, one or more chain rings 42 and an optional front derailleur (not shown), a rear chain cassette 44, a rear derailleur 45, and a chain 46. Pushing downward on the pedals 41 causes the chain ring 42 to engage the chain 46 and pull the chain onto the top portion of the chain ring, thereby pulling on one of the gears in the rear cassette 44 through the tension segment 47 of the chain 46. For the purposes of this disclosure, the location where the tension segment 47 of the chain 46 first contacts the chain ring 42 as it is pulled forward onto the chain ring is referred to as the tangent contact point 48.

FIG. 10 serves to illustrate the position of the components of the chain drive 40 relative to the axle line 55 that extends between the axle 18 and the IC 56 of the suspension system 50, as the suspension system moves between the extended position 52 and the compressed position 54. As can been seen, the location of the CC 58 of the rear axle 18 as it moves along CC path 59 is configured to remain proximate the tangent contact point 48 between the chain ring 42 and the tension segment of the chain 47 throughout the full range of motion of the suspension system 50. The inventors have found that by designing the suspension system 50 so that the CC 58 is located proximate the tangent contact point 48 throughout the full range of motion of the suspension system 50, the cross-coupling of the driving force being transmitted to the rear wheel along the tension segment 47 of the chain 46 into the suspension system 50 is reduced or substantially eliminated.

Moreover, the cross-coupling of forces is reduced or substantially eliminated regardless of the position of the suspension system 50 (e.g. whether the suspension system 50 is in the extended 52, an intermediate 52, or the compressed 54 position). This unexpected benefit can be accomplished through the careful selection of the lengths and orientations of the structural member 60 (not shown) and the linkage arms 70, 80, along with the careful selection of the locations of the pivot joints 74, 76, 84, 86.

Referring now to FIG. 11, in defining the proximity of the center of curvature CC 58 of the rear axle 18 to the tangent contact point 48 between the chain ring 42 and the tension segment of the chain 47, it may be stated that the CC 58 is located within a predetermined radius 51 of the tangent contact point 48 throughout the full range motion of the suspension system 50. This predetermined radius 51 is measured with respect to the horizontal (x) and vertical (y) coordinates of the drawing of FIG. 11, and does not include any axial (z) component as measured perpendicular to the plane of the drawing of FIG. 11. This is because the axial distance between the tangent contact point 48 on the chain ring 42 and the CC 58 of the rear axle 18 (which is a point in space located on the center plane of the bicycle), may vary greatly depending on the width (e.g. or axial length) of the bottom bracket 32 and the offset of the chain ring 42 to the right-hand side of the bicycle.

In the representative embodiment of the suspension system 50 shown in FIG. 11, for instance, this predetermined radius 51 is less than ½ of the radius 43 of the chain ring 42. Indeed, the predetermined radius 51 can range from less than about four centimeters to less than about one centimeter. Alternatively, in defining the proximity of the CC 58 to the tangent contact point 48 for suspension system 50, it may also be stated that the horizontal location of the CC 58 is bounded by a first vertical line 85 drawn through the lower anchor pivot joint 84 and a second vertical line 87 drawn through the lower floating pivot joint 86, also throughout the full range motion of the suspension system.

For bicycles having multiple chain rings and a front derailleur to move the chain between chain rings, the established tolerances disclosed above may be maintained even if the vertical location of the tangent contact point 48 moves as the chain is switched between chain rings.

Figure 13:
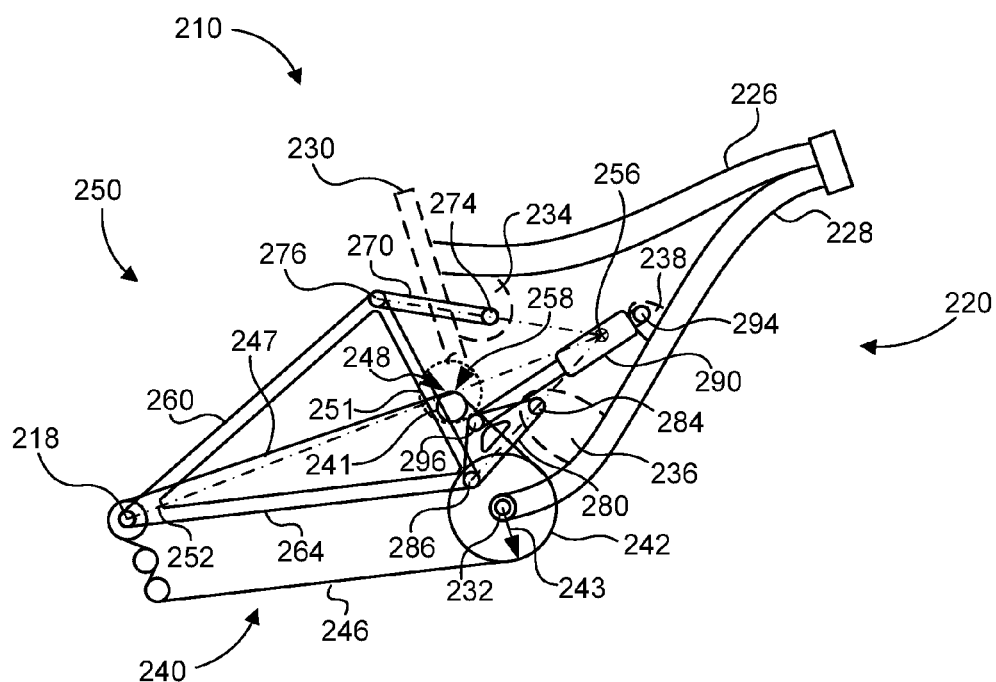
FIG. 13 is a close-up schematic view of a suspension system of a bicycle in an extended position, in accordance with another representative embodiment.

FIG. 13 is a close-up schematic view of a frame 220 and suspension system 250 of a bicycle 210 in an extended position 252, in accordance with another representative embodiment. In this implementation, the structural member 260 is a triangular truss 262, the upper linkage arm 270 is a forked bar member extending around the seat tube 230 and having two pivot joints 274, 276 when viewed from the side. The lower linkage arm 280 is a triangular truss member having three pivot joints 284, 286, 296 when viewed from the side. The two pivot joints 274, 276 on the upper linkage arm 270 correspond to the upper anchor pivot joint and the upper floating pivot joint for the linkage arm 270, respectively. The two pivot joints 284, 286 on the lower linkage arm 280 correspond to the lower anchor pivot joint and the lower floating pivot joint for the linkage arm 280, respectively, while the third pivot joint 296 corresponds to the shock floating pivot joint for the shock absorber 290. As can be seen, the shock absorber 290 is coupled between the frame 220 and the lower linkage arm 280, with the shock anchor pivot joint 294 being pivotably connected to shock anchor bracket 238 extending from the down tube 228 of the frame 220.

As with the embodiment of the suspension system described above, the depiction of the anchor brackets 234, 236, 238 for the linkage arms 270, 280 and for the shock absorber 290 are provided merely to show that the anchor pivot joints are fixed relative to the frame 220. Accordingly, the illustrated size, shape and locations of the anchor brackets 234, 236, 238 supporting the anchor pivot joints are not to be construed as limiting in any way. Moreover, additional brackets or cross-beam supports can be added as needed to locate the anchor pivot joints 274, 284, 294 at the desired locations relative to the frame 220 in general, and relative specifically to the bottom bracket 232 and the chain ring 242.

The chain drive 240 of bicycle 210 includes a pulley wheel 241 mounted to the seat tube 230 above the chain ring 242, with the tension segment 247 of the chain 246 between the rear axle 218 and the chain ring 242 being wrapped up and over the top of the pulley wheel. In this embodiment, the tangent contact point 248 of the chain drive 240 is located at the rearmost tangent contact point between the tension segment 247 of the chain 246 and the pulley wheel 241. Additionally, the pulley wheel 241 is positioned such that the location of the CC 258 of the rear axle 218 as it moves along CC path 259 remains proximate the tangent contact point 248 throughout the full range of motion of the suspension system 250. More specifically, the CC 258 is located within a predetermined radius 251 of the tangent contact point 248 throughout the full range motion of the suspension system 250, which predetermined radius may be less than ½ of the radius 243 of the chain ring 242. In another embodiment, the predetermined radius 251 may be less than about four centimeters, or even less than about two centimeters.

Figure 14:
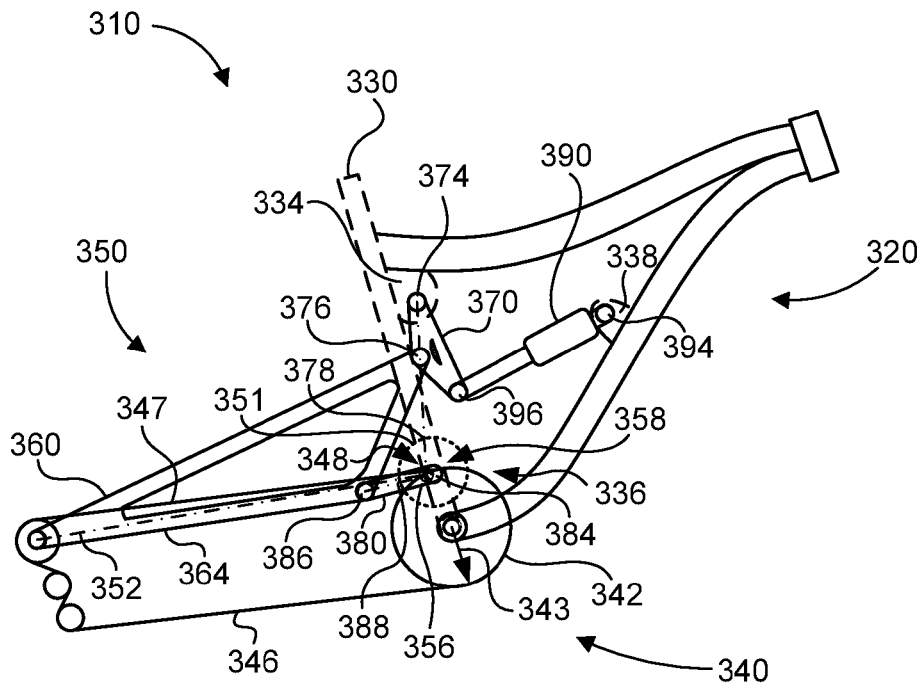
FIG. 14 is another close-up schematic view of a suspension system of a bicycle in an extended position, in accordance with another representative embodiment.

FIG. 14 is a close-up schematic view of a frame 320 and suspension system 350 of a bicycle 310 in an extended position 352, in accordance with another representative embodiment. In this implementation, the structural member 360 is a triangular truss 364, the upper linkage arm 370 is a triangular truss member having three pivot joints 374, 376, 396, and the lower linkage arm 380 is a forked bar member having two pivot joints 384, 386. The three pivot joints 374, 376, 396 on the upper linkage arm 370 correspond to the upper anchor pivot joint and the upper floating pivot joint for the linkage arm 370, respectively, while the third pivot joint 396 corresponds to the shock floating pivot joint for the shock absorber 390. The two pivot joints 384, 386 on the lower linkage arm 380 correspond to the lower anchor pivot joint and the lower floating pivot joint for the linkage arm 380, respectively.

In this embodiment, the shock absorber 390 is coupled between the frame 320 and the upper linkage arm 380, with the shock anchor pivot joint 394 being pivotably connected to shock anchor bracket 338 extending from the down tube 328 of the frame 320. As previously discussed, the depiction of the anchor brackets 334, 336, 338 for the linkage arms 370, 380 and the shock absorber 390 in the schematic view of FIG. 14 are provided merely to show that the anchor pivot joints are fixed relative to the frame 320, and are not considered to be limiting in any way.

In suspension system 350, the tangent contact point 348 of the chain drive 340 is again located where the tension segment 347 of the chain 346 first contacts the chain ring 342 as it is pulled forward onto the chain ring. In this embodiment, however, the orientation of the upper linkage line 378 is nearly vertical when the suspension system 350 is in the extended position 252. This results in both center of curvature (CC) 358 and the instantaneous center of rotation (IC) 356 being located proximate the tangent contact point 348 with the suspension system in the extended position 352. However, the CC 358 remains proximate the tangent contact point 248 when the suspension system 350 rotates upward to the compressed position (not shown), while the IC moves forward in space towards the front of the frame 320, due to the counter-clockwise rotation of the upper linkage arm 370.

As with the embodiments disclosed above, the CC 358 of suspension system 350 is located within a predetermined radius 351 of the tangent contact point 348 throughout the full range motion of the suspension system 350, which predetermined radius may be less than ½ of the radius 343 of the chain ring 342. In another embodiment, the predetermined radius 351 may be less than about four centimeters.

Figure 15:
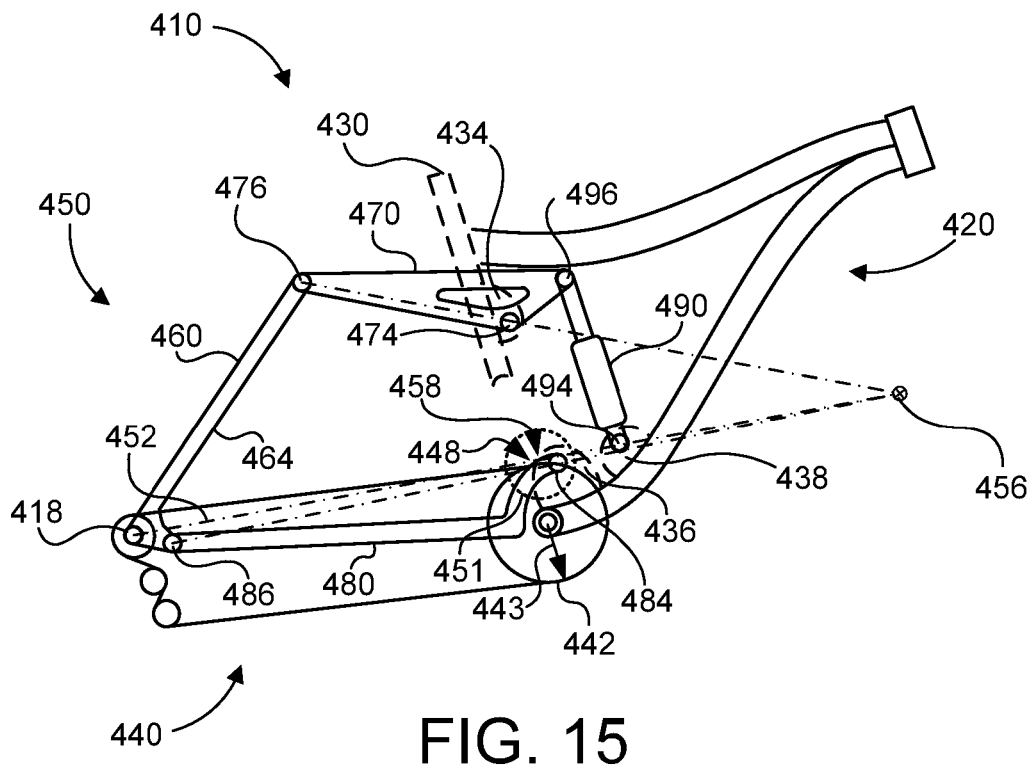
FIG. 15 is another close-up schematic view of a suspension system of a bicycle in an extended position, in accordance with another representative embodiment.

FIG. 15 is a close-up schematic side view of the frame 420 and suspension system 450 in an extended position 452 of yet another representative embodiment of the present disclosure. In this implementation, the structural member 460 is a straight member, such as a seat stay assembly 462. Although shown as a bar member in the side view, it is to be appreciated by anyone familiar with bicycles that the seat stay assembly is typically a forked structure with a downwardly-directed opening configured to receive the rear wheel (not shown), and with lower ends configured to support both sides of the rear axle 418.

Similar to the embodiment of FIG. 14, the upper linkage arm 470 of suspension system 450 is a triangular truss member having three pivot joints 474, 476, 496, and the lower linkage arm 480 is a straight member (e.g. a forked chain stay assembly) having two pivot joints 484, 486. The three pivot joints 474, 476, 496 on the upper linkage arm 470 correspond to the upper anchor pivot joint and the upper floating pivot joint for the linkage arm 470, respectively, while the third pivot joint 496 corresponds to the shock floating pivot joint for the shock absorber 490. The two pivot joints 484, 486 on the lower linkage arm 480 correspond to the lower anchor pivot joint and the lower floating pivot joint for the linkage arm 480, respectively.

Also with suspension system 450, the shock absorber 490 is coupled between the frame 420 and the upper linkage arm 480, with the shock anchor pivot joint 494 being pivotably connected to shock anchor bracket 438 extending from the down tube 428 of the frame 420. As previously discussed, the depiction of the anchor brackets 434, 436, 438 for the linkage arms 470, 480 and the shock absorber 490 in the schematic view are provided merely to show that the anchor pivot joints are fixed relative to the frame 420, and their size, shape and positions are not to be considered limiting in any way.

In suspension system 450, the tangent contact point 448 of the chain drive 340 is also located where the tension segment 347 of the chain 346 first contacts the chain ring 342 as it is pulled forward onto the chain ring. In this embodiment, however, the lengths of the linkage arms 470, 480 are much closer to the length of the structural member 460, forming a nearer-to-parallel linkage arm arrangement that places the instantaneous center of rotation (IC) 456 of the suspensions system 50 further forward relative to the frame 420 of the bicycle 410 than that of the other embodiments.

Nevertheless, the center of curvature (CC) 458 is still located proximate the tangent contact point 448 when the suspension system 450 is in the extended position 452, remains proximate the tangent contact point 448 as the suspension system rotates upward to the compressed position (not shown). Similar to the embodiments disclosed above, the CC 458 of suspension system 450 is located within a predetermined radius 451 of the tangent contact point 448 throughout the full range motion of the suspension system 450, which predetermined radius may be less than ½ of the radius 443 of the chain ring 442. In another embodiment, the predetermined radius 451 may be less than about four centimeters.

Figure 16:
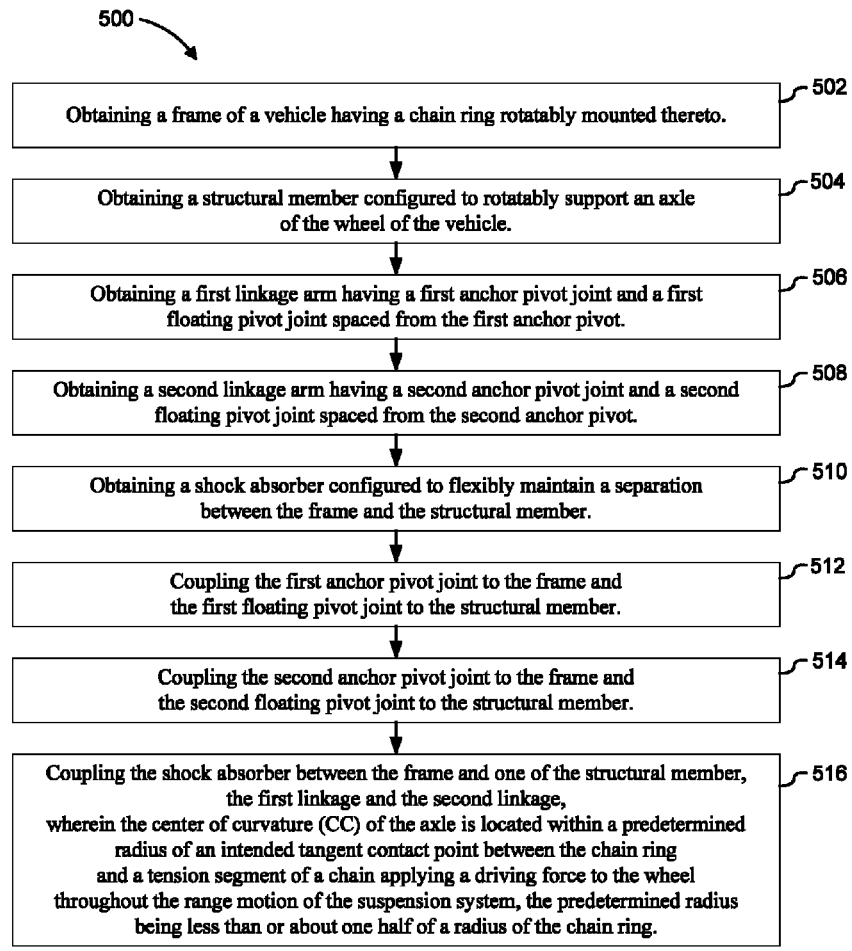
FIG. 16 is a flow chart depicting a method of making a suspension system for supporting a frame of a vehicle on at least one wheel of the vehicle, in accordance with another representative embodiment.

FIG. 16 is a flow chart depicting a method 500 of making a suspension system for supporting a frame of a vehicle on at least one wheel of the vehicle, in accordance with another representative embodiment of the present disclosure. The method includes obtaining 502 the frame of a vehicle having a chain ring rotatably mounted thereto, obtaining 504 a structural member configured to support an axle of the wheel of the vehicle at an axle location, obtaining 506 a first linkage arm having a first anchor pivot joint and a first floating pivot joint spaced from the first anchor pivot, obtaining 508 a second linkage arm having a second anchor pivot joint and a second floating pivot joint spaced from the second anchor pivot, and obtaining 510 a shock absorber configured to flexibly maintain a separation between the frame and the structural member.

The method 500 also includes coupling 512 the first anchor pivot joint to the frame and the first floating pivot joint to the structural member and coupling 514 the second anchor pivot joint to the frame and the second floating pivot joint to the structural member, wherein a first linkage line extending through the first floating pivot joint and first anchor pivot joint intersects with a second linkage line extending through the second floating pivot joint and the second anchor pivot joint to define an instantaneous center of rotation (IC) of the suspension system, and wherein a perturbation of the suspension system causes a plurality of intersecting axle lines extending from the axle location of the wheel to the IC to define a center of curvature (CC) of the axle location at the intersections thereof.

The method 500 further includes coupling 516 the shock absorber between the frame and one of the structural member, the first linkage arm and the second linkage arm, and wherein the CC of the axle location is located within a predetermined radius of a intended tangent contact point between the chain ring and a tension segment of the chain which will be installed to apply a driving force to the wheel. Moreover, the CC of the axle location is located within a predetermined radius of the intended tangent contact point throughout a range motion of the suspension system, with the predetermined radius being less than or about one half of the radius of the chain ring.

The method schematic diagram described above is generally set forth as a logical flow chart diagram. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A suspension system for supporting a frame of a vehicle on at least one wheel of the vehicle, the wheel being coupled via a chain to a chain ring located on the frame and the chain ring being rotatable to apply a driving force to the wheel along a tension segment of the chain, the suspension system comprising:

a structural member supporting an axle of the wheel;

a first linkage arm connecting the structural member to the frame, the first linkage arm including a first anchor pivot joint rotatably coupling the first linkage arm to the frame and a first floating pivot joint rotatably coupling the first linkage arm to the structural member;

a second linkage arm connecting the structural member to the frame, the second linkage arm including a second anchor pivot joint rotatably coupling the second linkage arm to the frame and a second floating pivot joint rotatably coupling the second linkage arm to the structural member;

a shock absorber coupled between the frame and one of the structural member, the first linkage arm and the second linkage arm, the shock absorber being configured to flexibly maintain a separation between the frame and the structural member, wherein a first linkage line extending through the first floating pivot joint and the first anchor pivot joint intersects with a second linkage line extending through the second floating pivot joint and the second anchor pivot joint to define an instantaneous center of rotation (IC) of the structural member, wherein a perturbation of the suspension system causes a plurality of intersecting axle lines extending from the axle to the IC to define a center of curvature (CC) of the axle at the intersections thereof, wherein the second linkage arm is between the chain ring and the first linkage arm, and wherein a location of the CC is bounded by a first vertical line drawn through the second anchor pivot joint and a second vertical line drawn through the second floating pivot joint, and the CC is disposed within a predetermined radius of a tangent contact point between the tension segment of the chain and the chain ring throughout a range motion of the suspension system, the predetermined radius being less than one half of a radius of the chain ring.

2. The suspension system of claim 1, wherein the structural member is a triangular truss.

3. The suspension system of claim 1, wherein the structural member is a seat stay assembly.

4. The suspension system of claim 3, wherein one of the first linkage arm and the second linkage arm is a chain stay assembly.

5. The suspension system of claim 1, wherein the vehicle is a bicycle.

6. The suspension system of claim 1, wherein the first linkage arm and the second linkage arm are located above an axis of rotation the chain ring.

7. The suspension system of claim 1, wherein the first linkage arm is located above an axis of rotation of the chain ring and the second linkage arm extends below the axis of rotation of the chain ring.

8. The suspension system of claim 1, wherein the predetermined radius is less than four centimeters.

9. The suspension system of claim 1, wherein the predetermined radius is less than two centimeters.

10. The suspension system of claim 1, wherein the predetermined radius is less than one centimeter.

11. The suspension system of claim 1, further comprising:
a pulley wheel proximate and above the chain ring and having the tension segment of the chain wrapped over the pulley wheel, and
wherein the tangent contact point is located at a rearmost tangent contact point between the tension segment and the pulley wheel.

12. A suspension system for supporting a portion of a frame of a bicycle on a rear wheel of the bicycle, the rear wheel being coupled via a chain to a chain ring located on the frame and the chain ring being rotatable to apply a driving force to the rear wheel along a tension segment of the chain, the suspension system comprising:
a structural member rotatably supporting an axle of the rear wheel;
an upper linkage arm connecting the structural member to the frame, the upper linkage arm including an upper anchor pivot joint rotatably coupling the upper linkage arm to the frame and an upper floating pivot joint rotatably coupling the upper linkage arm to the structural member;
a lower linkage arm connecting the structural member to the frame and spaced apart from the upper linkage arm, the lower linkage arm including a lower anchor pivot joint rotatably coupling the lower linkage arm to the frame and a lower floating pivot joint rotatably coupling the lower linkage arm to the structural member; and
a shock absorber coupled between the frame and one of the structural member, the upper linkage arm and the lower linkage arm, the shock absorber being configured to flexibly maintain a separation between the frame and the structural member,
wherein an upper linkage line extending through both the upper floating pivot joint and an upper anchor pivot joint intersects with a lower linkage line extending through both the lower floating pivot joint and the lower anchor pivot joint to define an instantaneous center of rotation (IC) of the structural member,
wherein a perturbation of the suspension system causes a plurality of intersecting axle lines extending from the axle to the IC to define a center of curvature (CC) of the axle at the intersections thereof,
wherein the second linkage arm is between the chain ring and the first linkage, and
wherein a location of the CC is bounded by a first vertical line drawn through the second anchor pivot joint and a second vertical line drawn through the second floating pivot joint, and the CC is disposed within a predetermined radius of a tangent contact point between the tension segment of the chain and the chain ring throughout a range motion of the suspension system, the predetermined radius being less than one half of the radius of the chain ring.

13. The suspension system of claim 12, wherein the predetermined radius is less than four centimeters.

14. The suspension system of claim 12, wherein the predetermined radius is less than two centimeters.

15. The suspension system of claim 12, wherein the predetermined radius is less than one centimeter.

16. A suspension system comprising:
a structural member supporting an axle of a wheel;
a first linkage arm connecting the structural member to a frame, the first linkage arm including a first anchor pivot joint rotatably coupling the first linkage arm to the frame and a first floating pivot joint rotatably coupling the first linkage arm to the structural member;
a second linkage arm connecting the structural member to the frame, the second linkage arm including a second anchor pivot joint rotatably coupling the second linkage arm to the frame and a second floating pivot joint rotatably coupling the second linkage arm to the structural member;
wherein a first linkage line extending through the first floating pivot joint and the first anchor pivot joint intersects with a second linkage line extending through the second floating pivot joint and the second anchor pivot joint to define an instantaneous center of rotation (IC) of the structural member,
wherein a perturbation of the suspension system causes a plurality of intersecting axle lines extending from the axle to the IC to define a center of curvature (CC) of the axle at the intersections thereof, and
wherein the CC is horizontally disposed between a first vertical boundary extending through the second anchor pivot point and a second vertical boundary extending through the second floating pivot point, and the CC is disposed within a predetermined radius of a tangent contact point between the tension segment of the chain and the chain ring throughout a range motion of the suspension system, the predetermined radius being less than one half of a radius of the chain ring.

* * * * *